(12) United States Patent
Hamada et al.

(10) Patent No.: US 6,267,397 B1
(45) Date of Patent: Jul. 31, 2001

(54) SUSPENSION APPARATUS FOR A VEHICLE

(75) Inventors: Kenji Hamada; Katsuyuki Komiya; Toshihide Koyama, all of Hiroshima (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/578,560

(22) Filed: May 25, 2000

Related U.S. Application Data

(63) Continuation of application No. PCT/JP99/06171, filed on Nov. 5, 1999.

(30) Foreign Application Priority Data

| Nov. 5, 1998 | (JP) | 10-314969 |
| Nov. 5, 1998 | (JP) | 10-314970 |
| Nov. 5, 1998 | (JP) | 10-314971 |

(51) Int. Cl.[7] .................................................. B60G 3/12
(52) U.S. Cl. ........................ 280/124.128; 280/124.154; 280/124.166
(58) Field of Search .................. 280/124.13, 124.153, 280/124.154, 124.166, 124.106, 124.128, 124.131

(56) References Cited

U.S. PATENT DOCUMENTS

| 4,432,564 | * | 2/1984 | Tronville | 280/689 |
| 4,637,628 | * | 1/1987 | Perkins | 280/689 |
| 4,750,757 | * | 6/1988 | Long | 280/689 |
| 5,409,254 | * | 4/1995 | Minor et al. | 280/665 |
| 5,520,407 | * | 5/1996 | Alatalo et al. | 280/124.166 |
| 5,813,691 | * | 9/1998 | Aoki et al. | 280/124.106 |

FOREIGN PATENT DOCUMENTS

| 58-102304 | 7/1983 | (JP) . |
| 60-47124 | 10/1985 | (JP) . |
| 4-283114 | 8/1992 | (JP) . |
| 6-227222 | 8/1994 | (JP) . |
| 11-78461 | 3/1999 | (JP) . |
| 11-278029 | 10/1999 | (JP) . |

\* cited by examiner

*Primary Examiner*—Paul N. Dickson
(74) *Attorney, Agent, or Firm*—Brooks & Kushman P.C.

(57) ABSTRACT

In a torsion beam type rear suspension, a joint seat (12c) with a torsion beam (4) is formed on each lower spring seat (12) to define an upward slope from the outer side to the inner side in the widthwise direction of the vehicle body to suppress separation of the spring seats and cracking of the beam.

16 Claims, 6 Drawing Sheets

SUSPENSION APPARATUS FOR A VEHICLE

This application is a continuation of PCT/JP99/06171 filed Nov. 5, 1999.

TECHNICAL FIELD

The present invention relates especially to a torsion beam type rear suspension apparatus in suspension apparatuses for a vehicle.

BACKGROUND ART

As a conventional suspension apparatus for a vehicle, a torsion beam type rear suspension apparatus which has a torsion beam coupled between right and left rear wheels, and a pair of trailing arms which are formed into a planar shape to allow a displacement in the widthwise direction of the vehicle body and extend from the two end portions of the torsion beam in the longitudinal direction of the entire vehicle body is known (see Japanese Patent Laid-Open No. 4-283114). In this suspension apparatus, the free end portions of the trailing arms are supported on a vehicle body frame via bushings, and the rear end portions of the trailing arms are joined to the right and left end portions of the torsion beam by welding.

The torsion beam type rear suspension apparatus is mounted in a light car or the like since it has a simple structure and is inexpensive. Also, such rear suspension apparatus can decrease the floor height and can assure a broad rear cargo space or the like, since the coil spring level can lower by disposing the center of the coil diameter of each coil spring not immediately above the trailing arm or torsion beam but to have an offset on the front or rear side of the vehicle body with respect to the torsion beam. Hence, demands in recent wagon and box type vehicles are increasing.

However, in the technique of the aforementioned reference, when a spring seat or its bracket is formed at a corner portion, the actual effective length of the trailing arm becomes short, and torsional elasticity increases, resulting in poor riding comfort. For this reason, each trailing arm may be prolonged in correspondence with a decrease in effective length, but such long trailing arm disturbs layout efficiency. On the other hand, the torsion beam may be prolonged. However, the torsional elasticity of the torsion beam then becomes too low, resulting in poor driving stability, or the mechanical strength of that portion of the torsion beam on which the torsional stress is concentrated must be increased and may lead to high cost resulting from an increase in weight.

In the suspension apparatus in which the center of the coil diameter of each coil spring is disposed to have an offset on the front side of the vehicle body with respect to the torsion beam, since the torsion of the torsion beam is larger than that of the suspension apparatus in which the center of the coil diameter of each coil spring is disposed to have an offset on the rear side of the vehicle body, the separation of the joint surface between the spring seat and torsion beam becomes large. Even when their joint strength is increased, the torsional stress is concentrated, and the joint surface of the torsion beam cracks.

DISCLOSURE OF INVENTION

The present invention has been made in consideration of the aforementioned problems, and has as its object to provide a suspension apparatus for a vehicle which can suppress a spring seat from separating and a torsion beam from cracking due to concentration of the torsional stress on the torsion beam, and can maintain high suspension performance by a lightweight and inexpensive structure.

In order to solve the above problems and to achieve the object, a suspension apparatus for a vehicle according to the present invention comprises the following arrangement.

That is, a torsion beam type rear suspension apparatus for a vehicle comprises a torsion beam which is coupled between right and left wheels and allows a torsional displacement produced between the wheels, a pair of right and left, planar trailing arms, which extend from two end portions of the torsion beam to predetermined positions in a back-and-forth direction of a vehicle body, and are pivotally and axially supported at the predetermined positions to allow a displacement in a lateral direction of the vehicle body, and coil spring seats joined to one side surface of the torsion beam on a front side of the vehicle body, and the torsion beam and the coil spring seats are joined via stress relaxing means.

With this structure, high suspension performance can be maintained by a lightweight and inexpensive structure while suppressing the spring seat from separating and the torsion beam from cracking due to concentration of the torsional stress on the torsion beam.

Preferably, the coil spring seats are provided to be spaced a predetermined spacing from the trailing arms in a widthwise direction of the vehicle body, and the apparatus further comprises dampers, lower end portions of which are pivotally and axially supported in spaces with the predetermined spacing.

With this structure, since the coil spring seat can have an offset with respect to the torsion beam, a lower floor height can be assured, and can broaden the rear cargo space or the like. Since the coil spring seat is not coupled to the trailing arm, a sufficiently large effective length can be assured and a compact suspension structure can be realized even when the trailing arm is shortened.

Furthermore, since the coil spring seat is cantilever-supported on the torsion beam, a force for separating the coil spring seat from the torsion beam acts due to the counter force of the coil spring and the torsion of the torsion beam, but such force can be effectively prevented by the damper.

As a result, cracking and fatigue of the joint portion between the torsion beam and coil spring seat can be eliminated, and no extra rigidity improvement such as an additional reinforcement plate for improving the mechanical strength of the joint portion is required, thus reducing the unsprung weight while assuring a large effective length of the trailing arm.

Preferably, the lower end portions of the dampers are axially supported by lower end portions of the trailing arms.

With this structure, in addition to the aforementioned effects, since the damper lower end portion is axially supported by the trailing arm lower end portion, the correcting force of the damper effectively acts as an upward bending force on the torsion beam via the coil spring seat, and a large damper length can be assured.

Preferably, the dampers are axially supported via pivot allowing means so as to be pivotal about axial centers thereof.

With this structure, in addition to the aforementioned effects, since pivotal motion of the damper is allowed only about its axial center, the damper can satisfactorily correct motions of the torsion beam and trailing arm.

Preferably, the dampers are disposed toward a direction range from a direction substantially parallel to upright surfaces of the trailing arms to an inward direction of the vehicle body.

With this structure, in addition to the aforementioned effects, the stretching direction of the damper can be restricted in a predetermined direction, and restriction of the stretching direction can assure an appropriate correcting force with respect to the torsion beam and trailing arm.

Preferably, joint seats with the torsion beam are formed on the coil spring seats to define an upward slope from an outer side to an inner side in a widthwise direction of the vehicle body.

With this structure, in addition to the aforementioned effects, high suspension performance can be maintained by a lightweight and inexpensive structure while suppressing the spring seat from separating in the outward widthwise direction of the vehicle body and the torsion beam from cracking due to concentration of the torsional stress on the torsion beam.

Preferably, each of the coil spring seats has a box shape, which has a rear flange portion that stands upright on a rear edge in the back-and-forth direction of the vehicle body, and inner and outer flange portions that stand upright on two ends in the widthwise direction of the vehicle body, and a back surface of at least the rear flange portion is joined to a front surface of the torsion beam in the back-and-forth direction of the vehicle body.

With this structure, the coil spring seat can be laid out to have an offset from the torsion beam, and the separation of the rear flange portion and cracking of the beam due to concentration of the torsional stress on the torsion beam can be suppressed.

Preferably, the inner flange portion has an arm portion extending up to a top of the torsion beam.

With this structure, concentration of the torsional stress on the torsion beam can be suppressed even when the joint strength of the coil spring seat is increased.

Preferably, the coil spring seats are spaced a predetermined spacing from the trailing arms in the widthwise direction of the vehicle body.

With this structure, since concentration of the torsional stress can be suppressed even when the biasing force of the coil spring acts in the separation direction of the coil spring seat, the joint strength need not be increased, and high suspension performance can be maintained by a lightweight and inexpensive structure.

Preferably, a reinforcement portion is formed on the torsion beam in correspondence with a joint portion with each of the coil spring seats, the torsion beam has an inverted-U-shaped section having a lower open end, and an edge portion of a lower open end of each of the coil spring seats is extended compared to other portions.

With this structure, the torsional strength of a portion of the torsion beam where the torsional stress is readily concentrated can be improved, and cracks and the like can be suppressed from forming.

Preferably, the reinforcement portion is formed on a portion corresponding to a joint portion of the inner flange portion.

With this structure, the torsional strength of the inner flange portion of the torsion beam where the torsional stress is readily concentrated can be improved, and cracks and the like can be suppressed from forming.

Preferably, the reinforcement portion is formed on a portion corresponding to a joint portion of the outer flange portion.

With this structure, the torsional strength of the outer flange portion of the torsion beam where the torsional stress is readily concentrated can be improved, and cracks and the like can be suppressed from forming.

Preferably, a three-dimensional shape portion that allows a torsion of the torsion beam is formed on a portion of the torsion beam, which corresponds to a joint portion of each of the coil spring seats.

With this structure, high suspension performance can be maintained by a lightweight and inexpensive structure while suppressing the spring seat from separating and the torsion beam from cracking due to concentration of the torsional stress on the torsion beam.

Preferably, the three-dimensional shape portion is formed as a non-welded portion on at least the joint portion corresponding to the inner flange portion.

With this structure, suppression of the torsional deformation of the torsion beam can be relaxed, and the torsional stress can be suppressed from being concentrated.

Preferably, the three-dimensional shape portion is formed on a joint portion corresponding to the outer flange portion.

With this structure, suppression of the torsional deformation of the torsion beam can be relaxed, and the torsional stress can be suppressed from being concentrated.

BEST MODE FOR CARRYING OUT THE INVENTION

An embodiment of the present invention will be described in detail hereinafter with reference to the accompanying drawings.

Figure 1:
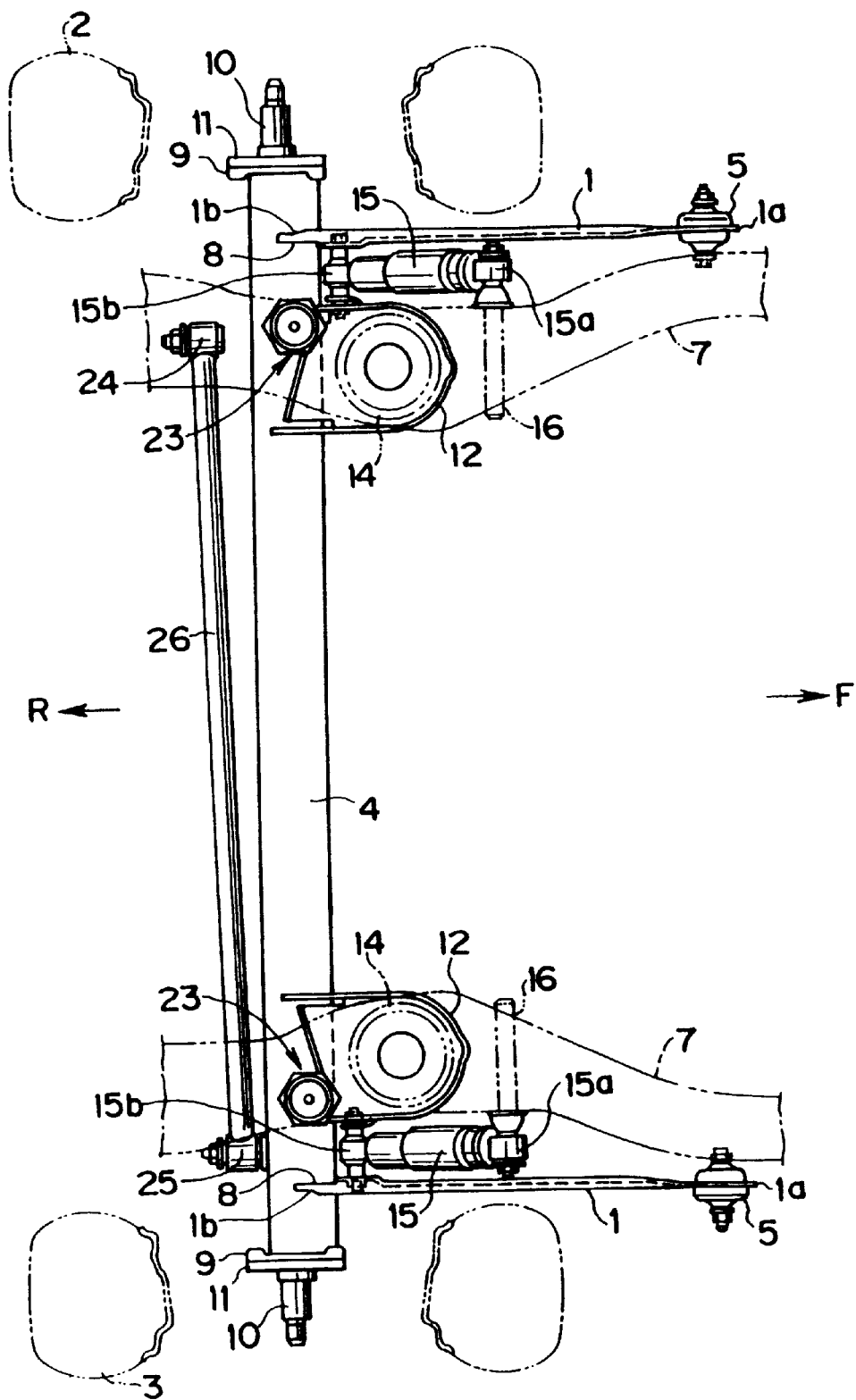
FIG. 1 is a plan view of a suspension apparatus for a vehicle of this embodiment.
Figure 2:
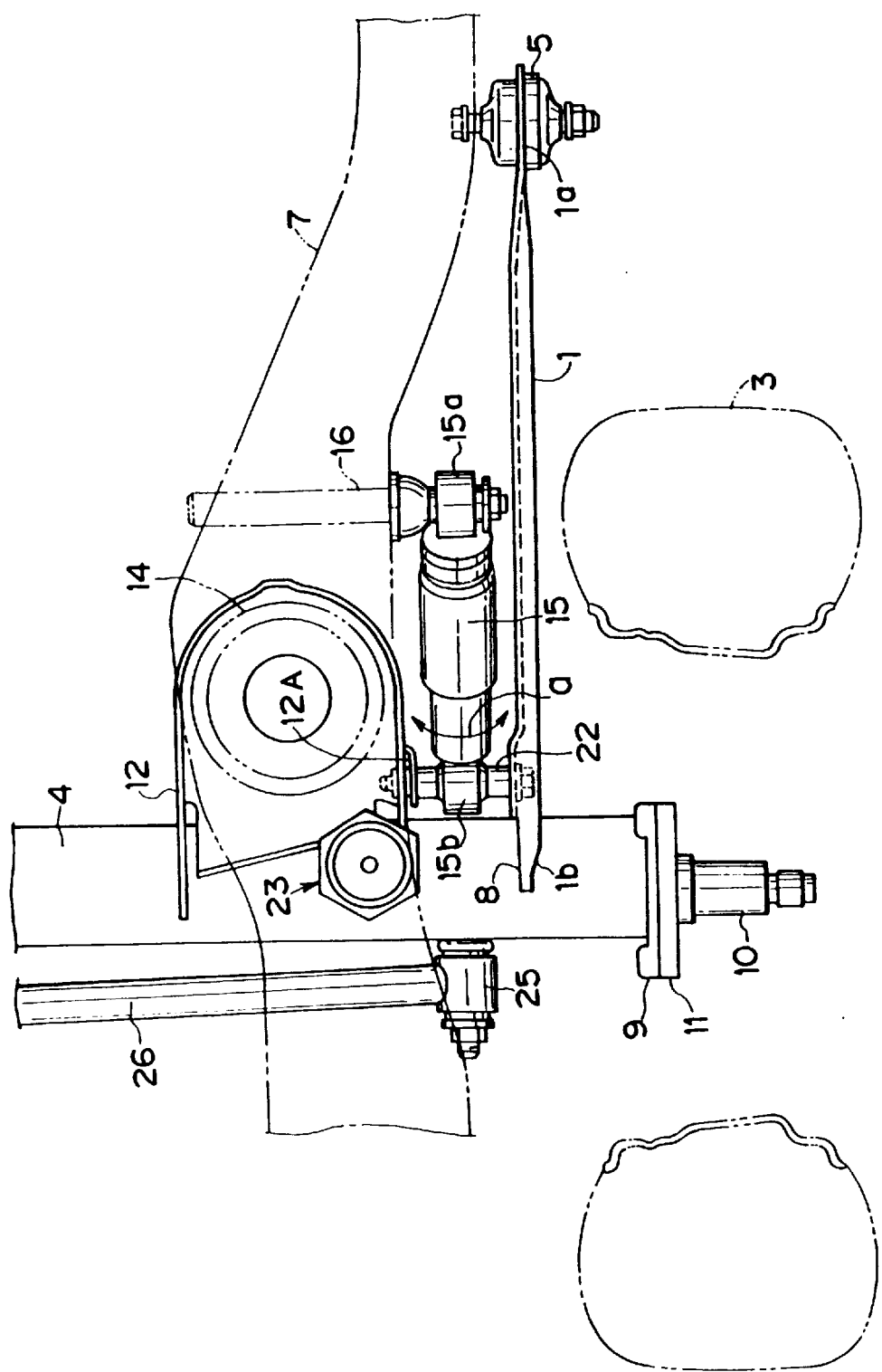
FIG. 2 is a plan view showing details around a torsion beam end portion.
Figure 3:
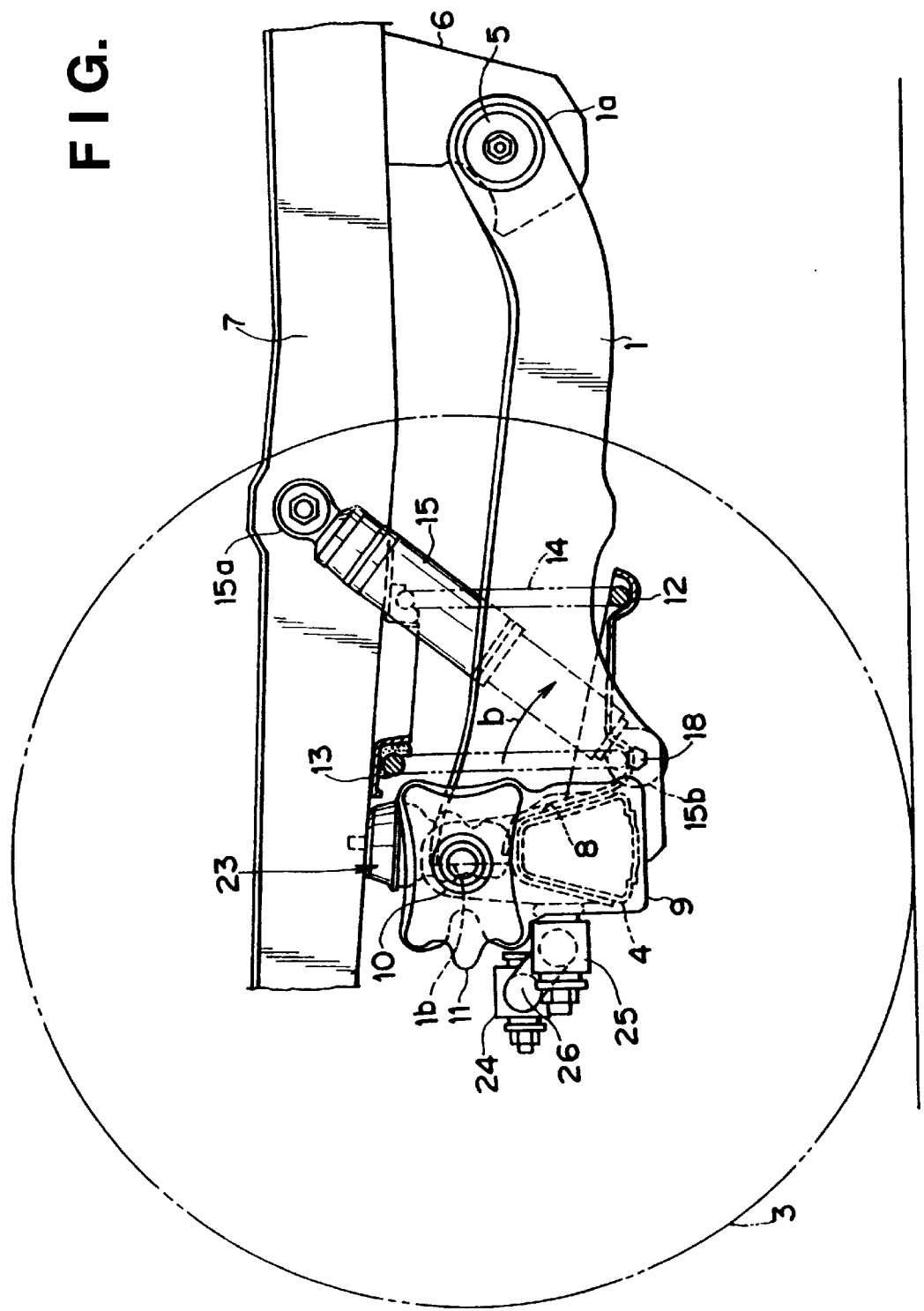
FIG. 3 is a side view showing details around a torsion beam end portion.
Figure 4:
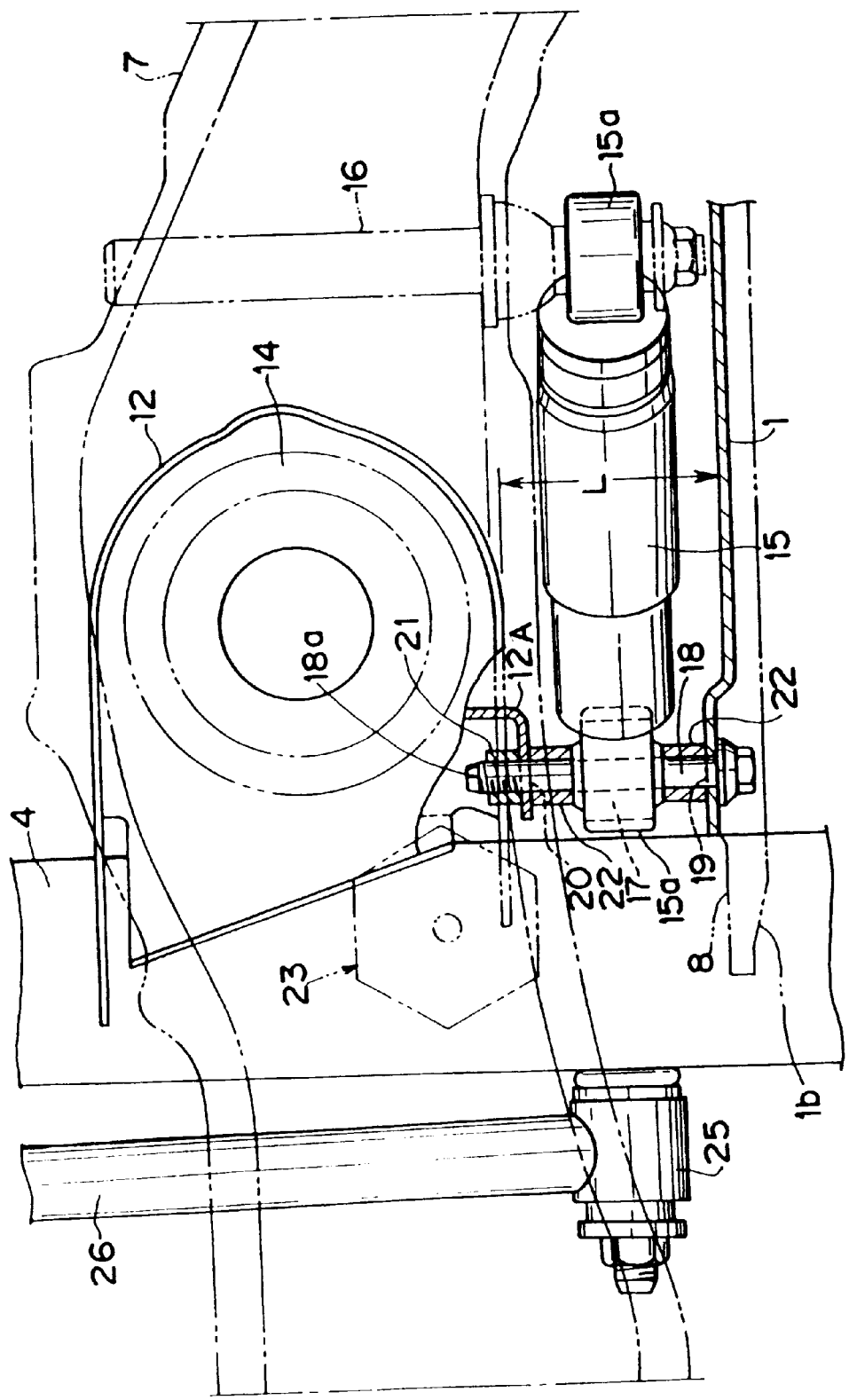
FIG. 4 is an enlarged view of FIG. 2.

FIG. 1 is a plan view of a suspension apparatus for a vehicle of this embodiment. FIG. 2 is a plan view showing details around a torsion beam end portion. FIG. 3 is a side view showing details around a torsion beam end portion. FIG. 4 is an enlarged view of FIG. 2.

As shown in FIGS. 1 to 4, this embodiment exemplifies a torsion beam type rear suspension apparatus which comprises planar trailing arms 1 each of which has an elasticity that allows inward torsion in the widthwise direction of the vehicle body, and a torsion beam 4 (a beam having an elasticity in the torsional direction) which extends in the widthwise direction of the vehicle body and is coupled between left and right wheels 2 and 3, and in which the center of the coil diameter of each coil spring is laid out to have an offset from the axial center of the torsion beam 4.

The torsion beam 4 has an inverted-U-shaped section with a lower open end. Each trailing arm 1 extends in the back-and-forth direction of the vehicle body, its front end portion 1a is pivotally supported on a floor arm 7 via a support bushing 5 and bracket 6, its rear end portion 1b is formed into a concave shape with a rear open end when viewed from the sideways, and that concave-shaped portion is joined to a slightly inner front surface portion from each of the two end portions of the torsion beam 4 by, e.g., welding or the like, thus forming a coupling portion 8 between the trailing arm 1 and torsion beam 4 (see FIG. 3).

Wheel support members 9 are joined to left and right end portions of the torsion beam 4, wheel supports 11 with spindles 10 are bolted up on the upper portions of the end faces of these wheel support members 9, and the wheels (i.e., rear wheels) 2 and 3 are attached to the spindles 10 via brake mechanisms.

Lower spring seats 12 having a nearly box shape are joined by welding or the like to the front surface of the torsion beam 4 to be spaced a predetermined spacing L from the trailing arms 1 inwardly in the widthwise direction of the vehicle body, upper spring seats 13 are joined by welding or the like to the lower surfaces of floor frames 7 to oppose the lower spring seats 12, and coil springs 14 extend between these lower and upper spring seats 12 and 13.

In the spaces of the predetermined spacing L, dampers 15 are laid out to be nearly parallel to the upright surfaces of the trailing arms 1, as shown in FIG. 4.

An upper end portion 15a of each damper 15 is axially supported on the outer surface of the floor frame 7 by an attachment member 16. A lower end portion 15b of each damper 15 is axially supported across the trailing arm 1 and the side surface of the lower spring seat 12. The lower end portion 15b of each damper 15 is pivotally and axially supported so that a rod 18 is inserted in turn into a bushing 17, a hole 19 formed in the lower end portion of the trailing arm 1, and a hole 20 formed in a rod attachment piece 12a integrally formed on the lower spring seat 12, a nut 21 threadably engages with a screw portion 18a of the rod 18 to rigidly fix the rod 18 to the trailing arm 1 and the rod attachment piece 12a of the lower spring seat 12. Also, each damper 15 is pivotal about the axial center in its longitudinal direction perpendicular to the pivotal axis of the bushing 17, i.e., in the direction of an arrow a shown in FIG. 2.

That is, lower end portion 15b of each damper 15 is disposed within the predetermined spacing L, and is pivotally and axially supported across the trailing arm 1 and lower spring seat 12. Note that a collar 22 is inserted between the inner surface of the lower end portion 15b and the outer circumferential portion of the rod 18 from the trailing arm 1 to the rod attachment piece 12A.

A bump stop rubber 23 is disposed on a portion between the torsion beam and floor frame 7, which is in the vicinity of the joint portion of each lower spring seat 12 to the torsion beam 4. A lateral link 26 extends in a slant shape between one of the floor frames 7 (an upper floor frame 7 in FIG. 1) located behind the torsion beam 4, and the back surface of the end portion of the torsion beam 4, which is farther from the one floor frame 7 via upper and lower support bushings 24 and 25, thus restricting unnecessary motions of each trailing arm 1 in the widthwise direction of the vehicle body. Note that F indicates the front direction of the vehicle body, and R the rear direction of the vehicle body in FIG. 1.

Figure 5:
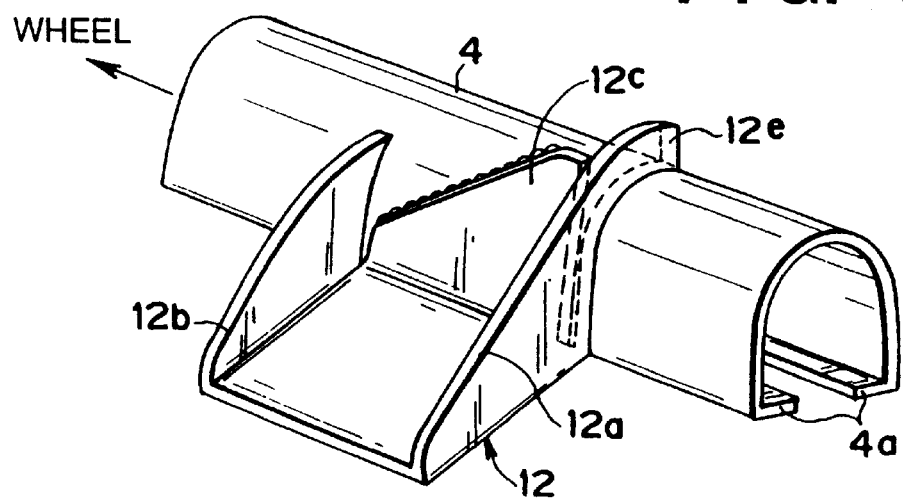
FIG. 5 is a view showing a first joint structure of a lower spring seat 12 and torsion beam 4.

As shown in FIG. 5, each lower spring seat 12 has a box shape defined by inner, outer, and rear flange portions 12a, 12b, and 12c which respectively stand upright on the rear end in back-and-forth direction of the vehicle body and on the two ends in the widthwise direction of the vehicle body so as to have an upper open end and a front open end in the back-and-forth direction of the vehicle body, and the rear edges of the inner and outer flange portions 12a and 12b, and the back surface of the rear flange portion 12c are joined along the front surface of the torsion beam 4 in the back-and-forth direction of the vehicle body. Note that only the rear flange portion 12c may be joined to the torsion beam 4 so as to be cantilever-supported.

Each coil spring seat 12 is cantilever-supported on the torsion beam 4 at its inner, outer, and rear flange portions 12a, 12b, and 12c. The inner flange portion 12a has an arm portion 12e which extends up to the top of the torsion beam 4.

In the suspension apparatus of this embodiment with the above structure, when the rear wheels bounce, the end portion of the torsion beam 4 is displaced nearly immediately upward (slightly inwardly in the widthwise direction of the vehicle body) while being twisted forward and, at the same time, the rear end portion 1b of each trailing arm 1 is displaced while being twisted nearly immediately upward (slightly inwardly in the widthwise direction of the vehicle body) along an arcuated path having the support bushing 5 as a fulcrum.

According to the aforementioned structure, when one of the wheels 2 and 3 bounces and rebounces, a force for separating the joint portion of each lower spring seat 12 to the torsion beam 4 acts due to the downward counter force of the coil spring 14, and the torsion and bending of the torsion beam 4. However, the rod 18 and damper 15 minimize bending and torsion of the portion with the spacing L, and correct separation.

The upper side of the rear end portion of each trailing arm 1 is twisted toward the inner side of the vehicle body. For this reason, by attaching the rod 18 to the lower end portion of each trailing arm 1, a correcting force acts on the lower spring seat 12, thus preventing its joint portion to the torsion beam 4 from separating.

Furthermore, since each lower spring seat 12 can have an offset from the torsion beam 4, a still lower floor height can be assured, and a rear cargo space or the like can be broadened. Since each lower spring seat 12 is not coupled to the trailing arm 1, even when the trailing arm 1 is shortened, a sufficiently large effective length can be assured, and the suspension can be rendered compact.

Furthermore, since each lower spring seat 12 is cantilever-supported on the torsion beam 4, a force that makes the lower spring seat 12 separate from the torsion beam 4 acts due to the counter force of the coil spring 14 and the torsion of the torsion beam 4. However, this force can be effectively prevented by the damper 15.

As a result, cracking and fatigue of the joint portion between the torsion beam 4 and each lower spring seat 12 can be eliminated, and no extra rigidity improvement such as improvement in welding strength of the joint portion or addition of a reinforcement plate or bracket is required. For this reason, the unsprung weight can be reduced while assuring a large effective length of each trailing arm 1, thus improving road gripping and driving stability.

In addition, since the lower end portion 15b of each damper 15 is axially supported by the lower end portion 1b of the trailing arm 1, the correcting force of the damper 15 effectively acts as an upward bending force on the torsion beam 4 via the lower spring seat 12, and a long damper length can be assured.

When the wheels 2 and 3 bounce and rebounce, the end portion of the torsion beam 4 and the rear end portion of each trailing arm 1 move in different ways. However, since the pivotal motion of each damper 15 is allowed about only its axial center (pivotal motion in the direction of the arrow a shown in FIG. 2) by the bushing 17 serving as pivot allowing means, the damper 15 can satisfactorily correct the motions of the torsion beam 4 and trailing arm 1.

Furthermore, since each damper 15 is laid out in a direction nearly parallel to the upright surface of the trailing arm 1, the stretching direction of the damper 15 can be restricted in a predetermined direction, and restriction of the stretching direction can assure an appropriate correcting force with respect to the torsion beam 4 and trailing arm 1. In this embodiment, each damper 15 is laid out in the direction nearly parallel to the upright surface of the trailing arm 1, but may be laid out so that its axial center points toward the inner side of the vehicle body, thus obtaining the same effect as described above.

When the torsion beam 4 has been twisted, since the inner, outer, and rear flange portions 12a, 12b, and 12c, and arm portion 12e of the lower spring seat 12 have a sufficient beam length with respect to the torsion of the torsion beam 4, separation due to torsional deformation or cracking of the torsion beam 4 due to the torsional stress take place less frequently. However, the outer and rear flange portions 12b and 12c readily separate due to torsional deformation since they have a short beam length with respect to the torsion of the torsion beam 4. Even when the joint strength of this joint portion is improved, the torsional stress is concentrated on that portion, and the corresponding portion of the torsion beam 4 cracks. Such shortcoming tends to occur conspicuously when the upper edge of the rear flange portion 12 is formed horizontally.

Furthermore, since the lower end portion 15b of each damper 15 is axially supported across the trailing arm 1 and lower spring seat 12, the biasing force of the coil spring 14 in the stretching direction and the damping force of the damper 15 act on the lower spring seat 12 when the rear wheels bounce, and these forces act as a shear force on the joint surface of the lower spring seat 12 and torsion beam 4 in the separation direction. For this reason, the fatigue strength of the joint surface of each lower spring seat 12 must also be improved.

Hence, this embodiment removes the aforementioned shortcomings by adopting the joint structures to be described below.

[First Joint Structure]

Figure 6:
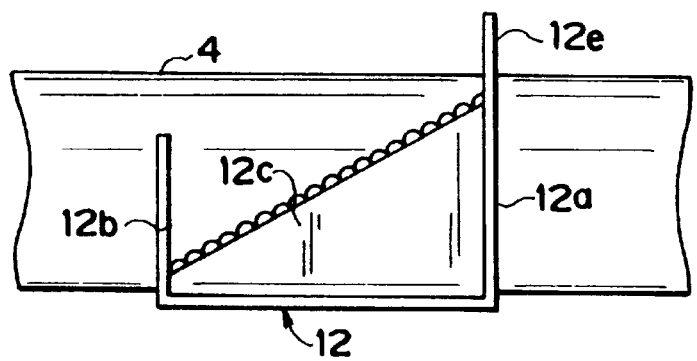
FIG. 6 is a front view of FIG. 5.

FIG. 5 shows the first joint structure of the lower spring seat 12 and torsion beam 4. FIG. 6 is a front view of FIG. 5.

As shown in FIGS. 5 and 6, in the first joint structure, the upper edge of the rear flange portion 12c is formed to define an upward slope from the outer side to the inner side in the widthwise direction of the vehicle body.

With this first joint structure, separation due to torsional deformation of the torsion beam 4 at the joint portion of the rear flange portion 12c, and formation of cracks owing to the improved joint strength to the torsion beam 4 can be suppressed. Furthermore, since the arm portion 12e which extends up to the top of the torsion beam 4 is formed on the inner flange portion 12a which is influenced less by the torsional deformation of the torsion beam 4, the joint strength can be improved while suppressing formation of cracks and the like.

As a result, the unsprung weight can be reduced without improving the joint strength (welding strength) of the lower spring seat or requiring any extra rigidity improvement, and high driving stability is also assured.

[Second Joint Structure]

Figure 7:
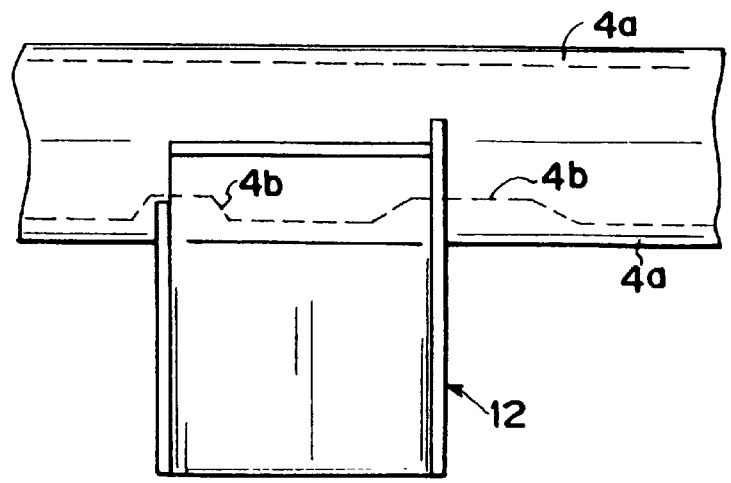
FIG. 7 is a view showing a second joint structure of a lower spring seat 12 and torsion beam 4.

FIG. 7 shows the second joint structure of the lower spring seat 12 and torsion beam 4.

As shown in FIG. 7, the second joint structure improves the mechanical strength against the torsional stress of the torsion beam 4 by forming extended portions 4b, which are formed by extending portions where the torsional stress is readily concentrated, i.e., portions corresponding to the inner flange portion 12a and arm portion 12e of the lower spring seat 12, at an edge portion 4a of the torsion beam 4, which is nearly horizontally bent inwardly. Note that the extended portions 4b may also be formed on portions corresponding to the outer flange portion 12b.

In the second joint structure, the mechanical strength corresponding to portions of the torsion beam 4 where the torsional stress is readily concentrated can be improved.

[Third Joint Structure]

Figure 8:
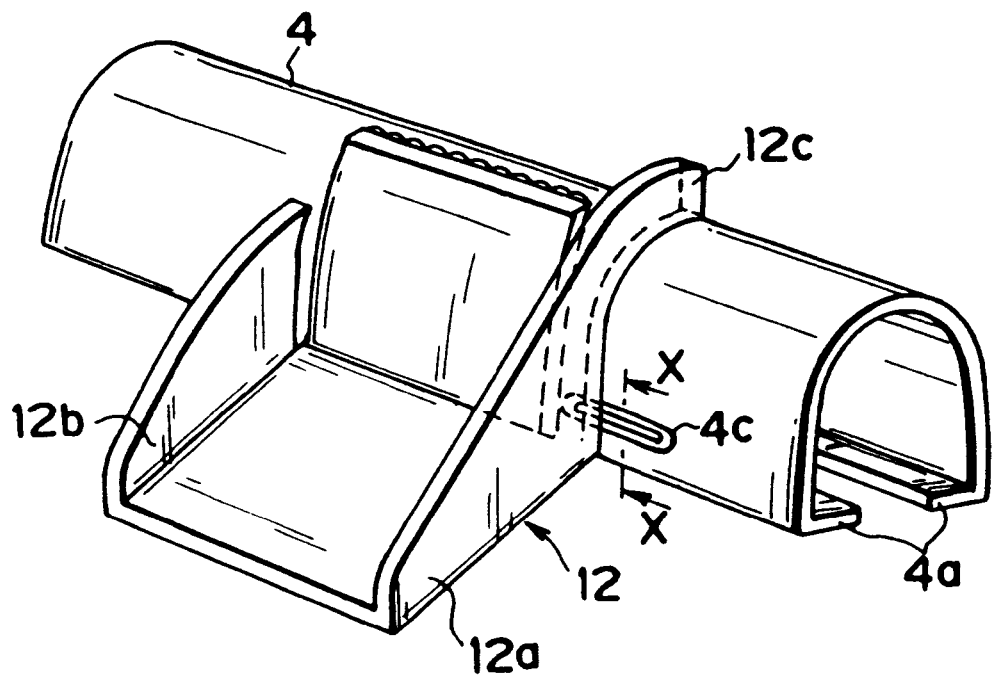
FIG. 8 is a view showing a first joint structure of a lower spring seat 12 and torsion beam 4.
Figure 9:
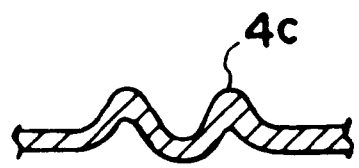
FIG. 9 is a sectional view taken along X—X in FIG. 8.

FIG. 8 shows the third joint structure of the lower spring eat 12 and torsion beam 4. FIG. 9 is a sectional view taken along X—X in FIG. 8.

As shown in FIGS. 8 and 9, a three-dimensional shape portion (bead portion) 4c that allows the torsional deformation of the torsion beam 4 in the widthwise direction of the vehicle body is formed on that portion of the front surface of the torsion beam 4, which corresponds to the joint surface with the rear edge of the inner flange portion 12a, and a concave portion of the three-dimensional shape portion 4c forms a non-welded portion with respect to the inner flange portion 12a. Note that the three-dimensional shape portion 4c may be formed on a portion corresponding to the joint surface with the outer flange portion 12a.

In the third joint structure, since the three-dimensional shape portion 4c can allow the torsional deformation of the portion where the torsional stress of the torsion beam 4 is readily concentrated, separation due to the torsional deformation of the torsion beam 4, and formation of cracks resulting from the improved joint strength can be suppressed.

In place of forming the three-dimensional shape portion 4c, a gap which is not welded may be formed at a joint portion between the torsion beam 4 and inner flange portion 12a (or outer flange portion 12b) to allow the torsional deformation of the torsion beam 4.

The present invention can be applied to changes or modifications of the above embodiment without departing from the scope of the invention.

For example, the first to third joint structures may be combined as needed.

INDUSTRIAL APPLICABILITY

The present invention can be applied to every vehicles in addition to an automobile as long as they support wheels and a vehicle body via suspensions.

What is claimed is:

1. A torsion beam type rear suspension apparatus for a vehicle, comprising:
   a torsion beam which is coupled between right and left wheels and allows a torsional displacement produced between the wheels;
   a pair of right and left, planar trailing arms, which extend from two end portions of said torsion beam to predetermined positions in a back-and-forth direction of a vehicle body, and are pivotally and axially supported at the predetermined positions to allow a displacement in a lateral direction of the vehicle body; and coil spring seats joined to one side surface of said torsion beam on a front side of the vehicle body, characterized in that said coil spring seats are provided to be spaced a predetermined spacing from said trailing arms in a widthwise direction of the vehicle body, and said apparatus further comprises dampers, lower end portions of which are pivotally and axially supported in spaces within the predetermined spacing and are axially supported by lower end portions of said trailing arms.

2. An apparatus according to claim 1, characterized in that said dampers are axially supported on a lower end portion of the trailing arms via pivot allowing means so as to be pivotal about axial centers thereof.

3. An apparatus according to claim 1, characterized in that said dampers are disposed toward a direction range from a direction substantially parallel to upright surfaces of said trailing arms to an inward direction of the vehicle body.

4. An apparatus according to claim 1, characterized in that joint seats connect said torsion beam and said coil spring, and are formed on said coil spring seats to define an upward slope from an outer side to an inner side in a widthwise direction of the vehicle body.

5. An apparatus according to claim 1, characterized in that each of said coil spring seats has a box shape, which has a rear flange portion that stands upright on a rear edge in the back-and-forth direction of the vehicle body, and inner and outer flange portions that stand upright on two ends in the widthwise direction of the vehicle body, and a back surface of at least the rear flange portion is joined to a front surface of said torsion beam in the back-and-forth direction of the vehicle body.

6. An apparatus according to claim 5, characterized in that the inner flange portion has an arm portion extending up to a top of said torsion beam.

7. An apparatus according to claim 5, characterized in that a reinforcement portion is formed on said torsion beam in correspondence with a joint portion with each of said coil spring seats, said torsion beam has an inverted-U-shaped section having a lower open end, and said reinforcement portion is formed by extending other portions of said lower open end from a joint portion on which said torsion beam and coil spring seat are connected.

8. An apparatus according to claim 7, characterized in that said reinforcement portion is formed on a portion corresponding to a joint portion of the inner flange portion.

9. An apparatus according to claim 7, characterized in that said reinforcement portion is formed on a portion corresponding to a joint portion of the outer flange portion.

10. An apparatus according to claim 7, characterized in that a three-dimensional shape portion that allows a torsion of said torsion beam is formed on a portion of said torsion beam, which corresponds to a joint portion of each of said coil spring seats.

11. An apparatus according to claim 10, characterized in that said three-dimensional shape portion is formed as a non-welded portion on at least the joint portion corresponding to the inner flange portion.

12. An apparatus according to claim 10, characterized in that said three-dimensional shape portion is formed on a joint portion corresponding to the outer flange portion.

13. An apparatus according to claim 1, characterized in that a reinforcement portion is formed on said torsion beam in correspondence with a joint portion with each of said coil spring seats, said torsion beam has an inverted-U-shaped section having a lower open end, and said reinforcement portion is formed by extending other portions of said lower open end from a position where said torsion beam and coil spring seats are connected.

14. An apparatus according to claim 1, characterized in that a three-dimensional shape portion that allows a torsion of said torsion beam is formed on a portion of said torsion beam, which corresponds to a joint portion of each of said coil spring seats.

15. An apparatus according to claim 1, characterized in that a lower end of said damper is axially supported by a lower end portion of said trailing arm and coil spring seats.

16. A torsion beam type rear suspension apparatus for a vehicle, comprising:

a torsion beam which is coupled between right and left wheels and allows a torsional displacement produced between the wheels;

a pair of right and left, planar trailing arms, which extend from two end portions of said torsion beam to predetermined positions in a back-and-forth direction of a vehicle body, and are pivotally and axially supported at the predetermined positions to allow a displacement in a lateral direction of the vehicle body; and coil spring seats joined to one side surface of said torsion beam on a front side of the vehicle body, characterized in that one end of a rod on which a lower end portion of said damper is axially supported, is connected to said trailing arm, and other end of said rod is connected to said coil spring seat.

* * * * *